(No Model.)
W. N. WILSON.
BACK STRAP CHECK HOOK FOR HARNESS.
No. 298,535. Patented May 13, 1884.
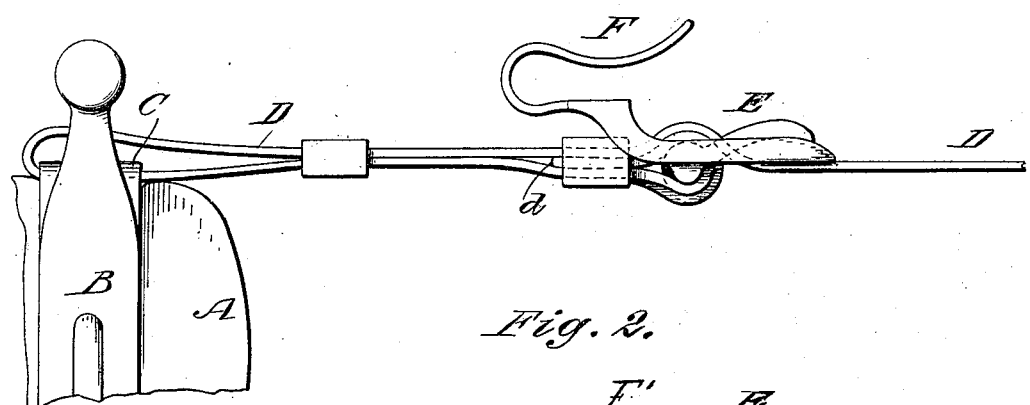
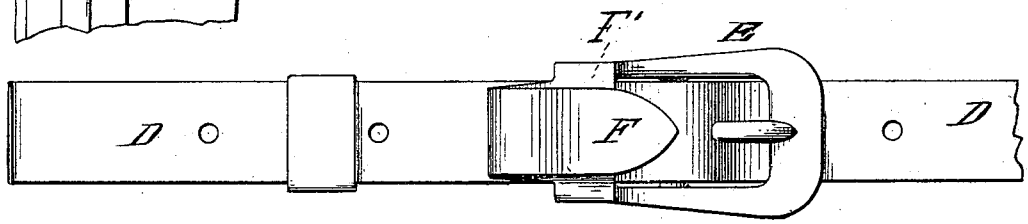
WITNESSES:
INVENTOR:
W. N. Wilson
BY
ATTORNEYS.

UNITED STATES PATENT OFFICE.

WILLIAM N. WILSON, OF SHIPPENSVILLE, PENNSYLVANIA.

BACK-STRAP CHECK-HOOK FOR HARNESS.

SPECIFICATION forming part of Letters Patent No. 298,535, dated May 13, 1884.

Application filed February 23, 1884. (No model.)

*To all whom it may concern:*

Be it known that I, WILLIAM N. WILSON, of Shippensville, Clarion county, Pennsylvania, have invented a new and Improved Back-Strap Check-Hook for Harness, of which the following is a full, clear, and exact description.

My invention relates more particularly to that class of harness having a plain pad or saddle without terrets or hooks, and having a back-strap running from the upper hame-strap through a loop in the back-pad or saddle to the hip-strap of the harness; and the invention consists, first, in providing the back-strap with a check-hook for holding the check-rein of the bridle; and, secondly, in combining the check-hook with the back-strap buckle.

Reference is to be had to the accompanying drawings, forming part of this specification, in which similar letters of reference indicate corresponding parts in both the figures.

Figure 1 is a side elevation of a part of the back-strap, hame, and collar of a harness, the back-strap having my check-hook attached thereto; and Fig. 2 is a plan view of the back-strap and check-hook.

A represents the collar; B, one of the hames; C, the upper hame-strap, and D the back-strap, which is looped around the hame-strap C in the ordinary manner. The end $d$ of the back-strap D is attached to the buckle E in the ordinary manner, and the said buckle E is of ordinary construction, except that it is formed or provided with the hook F, which is the check-hook of the harness, for receiving and holding the bridle-reins. The cross-piece to which the tongue is pivoted is formed near the center of the buckle-frame E. One end of this frame is curved upward, and is formed with a cross-piece, F', which cross-piece is extended forward and then curved rearward over the buckle-frame to form the check-rein hook F.

Heretofore in this class of harness, if the horse were checked up at all, the bridle-rein was thrown over the upper ends of the hames, which is objectionable, since the motion of the pole of the vehicle causes a continual motion of the hames, which is communicated through the bridle-rein to the bits in the horse's mouth, thus harassing and fretting the horse by the constant motion of the bit. By my arrangement of checking the horse to the back-strap the rein is made longer than for checking over the hames, which gives the horse a more free and uncramped use of his head, and overcomes all the objections set forth above, caused by the motion of the pole.

Having thus described my invention, I claim as new and desire to secure by Letters Patent—

1. The combination, with the back-strap D and the hame-strap, of the buckle E, provided on its forward end with a hook, F, the said back-strap being secured at one end to the cross-bar of the buckle, and passing around the hame-strap back through the loop of the buckle, where it may be adjusted by the tongue in the usual manner, substantially as set forth.

2. As an improved article of manufacture, a combined check-rein hook and buckle consisting of a buckle-frame, E, provided near its center with the usual cross-piece and tongue, and having its sides curved upward at one end, and there formed with a cross-piece, F', the said cross-piece being extended in a forward direction and then curved rearward toward the opposite end of the buckle-frame, to form the hook, said buckle-frame, cross-pieces, and hook being all formed in one piece, substantially as set forth.

WM. N. WILSON.

Witnesses:
M. M. FISHER,
E. S. AUSTIN.